United States Patent [19]

Cooley

[11] Patent Number: 4,587,141

[45] Date of Patent: May 6, 1986

[54] LAMINATED PANEL AND PROCESS

[75] Inventor: James Cooley, Orangeburg, S.C.

[73] Assignee: U.S. Plywood Corporation, Wilton, Conn.

[21] Appl. No.: 561,904

[22] Filed: Dec. 15, 1983

[51] Int. Cl.[4] .......................... B05D 3/02; B32B 27/10

[52] U.S. Cl. .................................... 427/379; 427/394; 427/397; 427/408; 428/211; 428/216; 428/425.1

[58] Field of Search ...................... 428/425.1, 216, 195, 428/211; 427/379, 394, 408, 397

[56] References Cited

U.S. PATENT DOCUMENTS

| | | | |
|---|---|---|---|
| 2,430,479 | 11/1947 | Pratt et al. | 428/425.1 |
| 2,804,400 | 8/1957 | Kelly et al. | 428/425.1 X |
| 2,897,094 | 7/1959 | Hayes et al. | 428/425.1 X |
| 3,117,019 | 1/1964 | Cohnen et al. | 428/425.1 X |
| 3,198,692 | 8/1965 | Bridgeford | 428/425.1 X |
| 3,687,801 | 8/1972 | Derby | 428/425.1 X |
| 4,104,432 | 8/1978 | Manabe et al. | 428/216 |
| 4,355,071 | 10/1982 | Chang | 428/425.1 X |
| 4,406,456 | 9/1983 | Berry et al. | 428/425.1 X |

*Primary Examiner*—Thomas J. Herbert
*Attorney, Agent, or Firm*—Perman & Green

[57] ABSTRACT

A decorative panel and process for producing the same are provided. The panel includes a wood base substrate to which an ink imprinted decorative paper is adhered. An isocyanate solution is applied to the decorative paper and is allowed to penetrate into the paper to fortify the inks and paper. The partially completed panel then is subjected to drying to remove the solvent used to transport the isocyanate into the paper. A top coat of a photo-curable material then is applied to the panel, and the panel is subjected to appropriate radiation for curing the top coat.

14 Claims, 2 Drawing Figures

LAMINATED PANEL AND PROCESS

BACKGROUND OF THE INVENTION

Decorative laminated panels have many structural applications including walls and tops for furniture such as desks, tables and counters. Typically the decorative laminated panel includes a substrate or base formed from wood or wood by-products. A sheet of decorative material is adhered to the substrate and one or more top coats then are applied over the decorative layer to provide an attractive and protective finish.

The decorative layer of the panel usually is either a decorative vinyl between two and six mils thick or a paper imprinted with decorative inks to yield a desired color and/or pattern. In recent years the cost of vinyl has increased substantially, thereby making the vinyl coated decorative panels commercially less attractive. Panels produced with decorative papers generally can be manufactured at a lower cost than the corresponding vinyl clad panels and in many instances are considered to provide superior aesthetics.

Despite their lower cost and their desireable aesthetic properties, decorative papers have been too fragile for many types of panels. More particularly, the decorative layer of the panel easily could be damaged during normal use thus offsetting any initial aesthetic advantages of the decorative paper. The deficiencies of panels with layers of decorative paper are caused in part by both the fragile nature of paper and a poor bond of the ink to the paper. Furthermore many previously used top coats did not adequately penetrate the paper and ink, and thus the top coats were poorly bonded to the paper and ink. This drawback of top coats used with decorative panels having decorative paper layers has been particularly evident with photo-curable top coats. Photo-curable coatings are desireable because they are aesthetically attractive, they have good protective qualities and they can be cured very quickly. However, photo-curable coatings are also very viscous (100 c.p.s. to 3,000 c.p.s.). Thus they do not penetrate the ink and paper to fortify the two and to ensure a strong bond of the cured coating to the paper.

Several attempts have been made to provide improved laminated articles. For example, U.S. Pat. No. 2,430,479 which issued to Pratt et al shows that the bond between polymeric materials in laminated structures can be improved by coating the surface of the first applied polymeric layer with an isocyanate solution, subsequently allowing the isocyanate solution to flash off and then applying the second layer of polymeric material and heating the various layers together under pressure. U.S. Pat. No. 2,430,479 indicates that the disclosed process provides an enhanced bond which is due apparently to the reaction of the isocyanate to the polymeric materials on either side of it. Certain of the examples provided in U.S. Pat. No. 2,430,479 show: the bonding of alkyd resin to regenerate cellulose by means of a diisocyanate; the bonding of nitrocellulose to regenerated cellulose by means of an alkyde resin and a diisocyanate; the bonding of cellulose nitrate to cellulose with a diisocyanate; and the bonding of nitrocellulose to regenerated cellulose employing polyvinyl butyral and a diisocyanate.

U.S. Pat. No. 2,804,400 which issued to Kelly et al is directed to a wood coating method to be used for baseball bats, bowling pins and the like. More particularly U.S. Pat. No. 2,804,400 shows first applying at least one polyisocyanate-containing ethyl cellulose layer to the bare surface of the wood and subsequently applying at least one layer of an ethyl cellulose coating composition. One embodiment of the method shown in U.S. Pat. No. 2,804,400 shows the application of a polyisocyanate compound to the bare surface of the wood as a primer before the application of the polyisocyanate containing ethyl cellulose layer. The disclosure of U.S. Pat. No. 2,804,400 indicates that the resulting laminated structure is protected well against damage from impact and deterioration.

Another laminated structure is shown in U.S. Pat. No. 3,687,801 which issued to Derby and is directed to a process wherein a cellulosic substrate such as hardboard, particle-board or plywood is first coated with an adhesive of acrylates and isocyanate in a toluene solution. The coated substrate of U.S. Pat. No. 3,687,801 then is convection dried by passing through an oven and then is coated with an acrylic film which is pressed on at about 250° F. As stated in U.S. Pat. No. 3,687,801 the adhesive applied intermediate the acrylic film and the cellulosic substrate yields a laminated structure with substantial peel resistance.

Still another laminated structure is shown in U.S. Pat. No. 4,104,432 which issued to Manabe et al and shows molded plastic articles which are coated initially with a thin metal film and then with a paint having a polyisocyanate therein. As shown in U.S. Pat. No. 4,104,432, this initial paint layer is cured by heating and a second coat of paint then is applied and is cured by ultra-violet rays.

Other laminated articles are shown in U.S. Pat. No. 2,911,321 which issued to Herrmann et al, U.S. Pat. No. 3,117,019 which issued to Cohnen et al, and U.S. Pat. No. 3,198,692 which issued to Bridgeford.

Although certain of the above identified disclosures show various methods that purport to improve laminated structures, none of the disclosures are directed to laminated structures wherein one of the layers is a fragile decorative paper which has been imprinted with a decorative ink. More particularly, none of the above identified disclosures suggest improved decorative panels employing ink imprinted decorative papers. Furthermore none suggest the use of photo-curable coatings with decorative papers.

Accordingly, it is an object of the subject invention to provide an improved decorative panel.

It is another object of the subject invention to provide a decorative panel with a decorative paper layer.

It is a further object of the subject invention to provide a decorative panel which is aesthetically attractive and resistant to damage.

It is still another object of the subject invention to provide a decorative panel in which the decorative paper and the inks therein are fortified, protected and adequately adhered to adjacent layers.

It is yet another object of the subject invention to provide a decorative panel with decorative paper layer and a photo-curable top coat.

SUMMARY OF THE INVENTION

The decorative panel of the subject invention is formed on a substrate of a wood base material such as particle board, medium density fiber board, hardboard or plywood. The substrate is prepared by sanding to provide a smooth surface for receiving the decorative paper and various top coats. One or more layers of adhesive such as polyurethane, polyester, epoxy, polyvinyl acetates or ethylene vinyl acetate are applied to the prepared surface of the substrate. In a preferred embodiment, as explained further below, two separate coats of adhesive are applied with each coat being suitably dried after its application. The adhesives are appropriately reactivated by, for example, infrared light and the decorative paper laminate is pressed onto the adhesive in a rolling press.

After appropriate edge and end trimming and brushing of the decorative paper layer, a coating of an isocyanate solution is applied to the laminated panel. More particularly a dilute solution of isocyanate comprising between approximately 5% and 10% isocyanate by weight in a solvent is applied at a rate of approximately 1 to 3 mils wet. The isocyanate solution is allowed to penetrate into the decorative paper layer to fortify the ink and paper. After a sufficient penetration time the coated panel is passed through a drying station to remove the solvent from the ink and paper.

One or more layers of a photocurable top coat then are applied at a rate of approximately 0.2 mils to 5.0 mils wet, with a preferred rate of approximately 2.0 mils. The panel with the top coat applied thereto then is subjected to radiation to cure the top coat. The finished product then is appropriately packaged for shipment.

In the finished product, the isocyanate penetrates and fortifies the decorative paper and inks to an extent that is not considered possible with the photo-curable coatings alone. Additionally, the isocyanate solution substantially enhances the bond of the decorative paper to the top coat. As a result, the finished panel is aesthetically attractive and is sufficiently durable for use in a variety of environments which heretofore had been considered unacceptable for decorative panels employing a decorative paper layer.

DETAILED DESCRIPTION OF THE PREFERRED EMBODIMENTS

Figure 1:
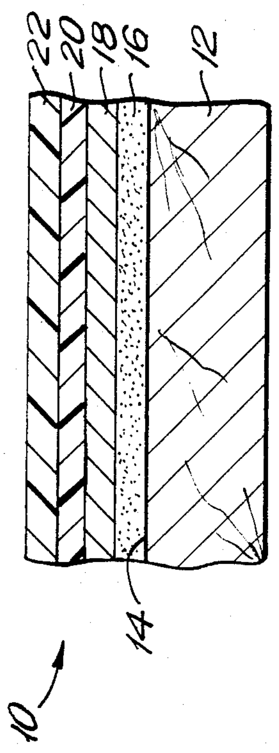
FIG. 1 is cross-sectional view of a portion of a panel of the subject invention.

The decorative panel of the subject invention is indicated generally by the numeral 10 in FIG. 1. The panel 10 is formed on a substrate 12 which preferably is a wood base material such as particle board, medium density fiber board, hardboard or plywood. Typically, the substrate 12 will be between ¼ inch and 1 inch thick, although substrates of other thicknesses are possible. The panel 10 is formed by first preparing the surface 14 of substrate 12 to eliminate surface discontinuities prior to the application of subsequent layers of the panel. Typically this preparation is accomplished by sanding and then brushing to eliminate loose particles. The preparation of surface 14 on substrate 12 is illustrated schematically as this first step of the block diagram of FIG. 2.

After the surface 14 of substrate 12 has been suitably prepared, adhesive 16 is applied to surface 14. Preferably the adhesive 16 is applied in two separate steps, with drying in between each application of adhesive. More particularly, the adhesive 16 applied to the substrate 12 may include polyurethane, polyester, epoxy, polyvinyl acetates or ethylene vinyl acetate. In a preferred embodiment the first coat of adhesive is a urethane which is applied at a rate of 1.0 to 2.0 grams per square foot, and is subsequently dried in a high velocity oven for 8 to 10 seconds at a temperature of 120° F. to 130° F. A second coat of adhesive which preferably is ethylene vinyl acetate is applied over the first coat at a rate of 2.0 to 3.0 grams per square foot, and is then dried in a high velocity oven for 8 to 10 seconds at a temperature of 130° F. to 150° F. The application and drying of the adhesive 16 is illustrated schematically as the second and third blocks of the diagram in FIG. 2.

Figure 2:
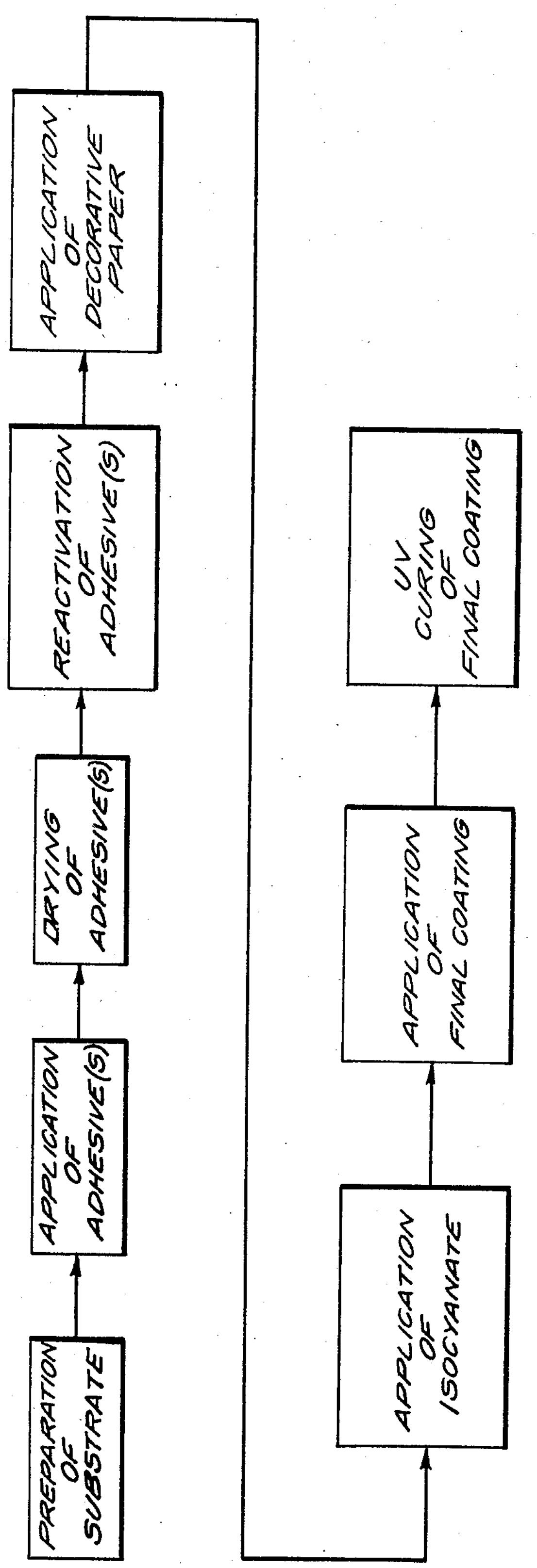
FIG. 2 is a schematic diagram of the process of the subject invention.

As further illustrated in FIG. 2 the adhesives are reactivated after they have been appropriately applied and dried. This reactivation preferably is accomplished by exposing the panel to intense infrared light to achieve a surface temperature of 160° F. to 200° F.

Decorative paper 18 is applied to the panel after the adhesives 16 have been appropriately reactivated. More particularly the decorative paper 18 has a basis weight of between 15 grams and 100 grams per square meter, with the preferred paper 18 having a basis weight of approximately 23 grams per square meter. The paper 18 will have an appropriate decorative pattern and/or color imprinted thereon with decorative inks. In most instances, the decorative inks do not extend entirely through the paper 18, but are disposed substantially adjacent the surface of the paper 18 opposite the adhesive 16, with only partial penetration into the paper 18. The decorative paper 18 is pressed onto the adhesive 16 in a rolling press. The partially complete laminated panel then is edge trimmed, end trimmed and brushed to remove particles prior to subsequent coatings.

The partially completed panel 10 with the decorative paper 18 laminated thereto next is coated with a layer 20 of an isocyanate solution. One desireable feature of this isocyanate solution is its very low viscosity (5 c.p.s. to 50 c.p.s.). The low viscosity of the solution makes it exceptionally well suited for use with the above described decorative paper 18 in that the solution penetrates the paper 18 to fortify the inks and paper to create a more serviceable panel 10. As noted above, the high penetration of the paper had not been available with the photo-curable coatings because of the much higher viscosity of such coatings. Another desireable feature of the isocyanate solution is that isocyanate is chemically reactive with the hydroxyl which is functionally found in the cellulose of the paper and with the photo-curable top coats described below. Thus, in addition to fortifying the ink and paper, the isocyanate 20 substantially enhances the bond of the paper 18 to the subsequently applied top coats.

The isocyanate concentration in the solution preferably is in the range of 5% to 15%. Organic solvents used for dilution of the isocyanate could be esters, ketones, aromatics, napthenes or halogenated solvents. However, the most desirable results were achieved with isocyanate solutions employing toluene as the solvent.

During the development of the subject panel and process several isocyanates were tested including those sold by Upjhon Company under the product name Papi 135. Other isocyanates used were manufactured by the Mobay Chemical Corporation under the general product name Desmodur and the specific product identifications L2291A, N75 and Z4370. The Mobay isocyanates were deemed to have a better light stability, but it was noted that all isocyanates tested were relatively unstable to light. Consequently there was a noticeable change of color as the finished product aged. To control this light instability, the isocyanate solution was modified by the addition of ultra violet light absorbers. Those ultra violet light abserbers which were used include the GAF products No. 100, M-40, D-50, D-49, 490 and N539. These ultra violet light absorbers were mixed into the Upjohn isocyanate solutions at a rate of about 1% to 10% by weight and into the Mobay isocyanate solutions had a rate of about 1% to 5%.

The isocyanate solutions were applied to the decorative paper 18 of the panel 10 by a direct roll coating applicator. The isocyanate coating can vary from 0.5 mils wet to 5.0 mils wet, but the preferred coating has a thickness of 2.0 mils wet.

The isocyanate layer 20 is allowed to penetrate into the decorative paper 18 to fortify the inks and paper of the decorative paper layer 18. This penetration period can vary from approximately 0.1 second to approximately 5 minutes. With the preferred isocyanate solutions, as described above, an acceptable penetration period is approximately 2.0 seconds.

The panel 10 with the isocyanate layer 20 applied thereto is dried after a suitable period has ellapsed for penetration of the isocyanate 20 into the decorative paper 18. The principal objective of the drying step is to remove the toluene after it has served the purpose of transporting the isocyanate through the ink layer and into the paper. The drying of the isocyanate and removal of the toluene preferably takes place in a high velocity oven for about 8 to 15 seconds at a temperature of 120° F. to 380° F., with a preferred temperature being approximately 280° F. This application and drying of the isocyanate layer is identified schematically by the sixth block of the diagram in FIG. 2.

The top coat 22 is a photo-curable coating, the principal function of which is to protect the decorative paper 18. This top coat 22 can be applied by direct roll coating, gravure coating or flow coating at a rate of 0.2 mils wet to 5.0 mils wet. The preferred coating thickness is 2.0 mils wet. The top coat 22 can be a cellulosic type, alkyd type, polyester type or acrylic type which is designed to cure rapidly when exposed to infrared energy, ultra violet energy or electron beam or gamma radiation. Preferably the top coat 22 is cured by UV radiation for a period of five to fifteen seconds, with a preferred curing time of 12 seconds. This ultra violet curing is illustrated schematically as the last step of the process diagram in FIG. 2.

After the above identified rapid ultra violet curing, the finished panel 10 is ready for packaging and shipment.

In summary a new and improved decorative panel is provided which includes a wood base substrate to which an ink imprinted decorative paper is adhered. A layer of an isocyanate solution is applied to the decorative paper and is allowed to penetrate into the paper to fortify the inks and paper and to render the paper more receptive to the top coatings of the panel. A photo-curable top coat then is applied to the panel to protect the decorative paper. The process for producing the subject panel includes an initial preparation of the substrate to eliminate surface discontinuities. The decorative paper then is adhesively applied to the prepared substrate and the isocyanate solution in turn is applied to the decorative paper. After a suitable penetration period, the panel with the coated decorative paper is dried to remove the solvent employed to transport the isocyanate into the decorative paper. A photocurable top coat finally is applied to the panel and then is subjected to curing radiation.

While the preferred embodiment of the subject invention has been described and illustrated, it is obvious that various changes and modifications can be made therein without departing from the spirit of the present invention which should be limited only by the scope of the appended claims.

What is claimed is:

1. A process for forming a decorative panel comprising the steps of:

providing a generally planar substrate of particle board, fiber board, hard board or plywood and an ink imprinted decorative paper;

adhering the decorative paper directly to the substrate by applying at least one layer of an adhesive to said substrate, drying said at least one adhesive layer, subsequently reactivating said at least one adhesive layer by heating and joining said decorative paper to said substrate by applying the paper directly over the reactivated adhesive layer;

applying 0.5 mils wet to 5.0 mils wet of an isocyanate solution including an organic solvent portion to the decorative paper;

allowing the isocyanate solution to penetrate into the decorative paper;

drying the decorative paper and panel to remove the solvent portion of the isocyanate solution but allowing the isocyanate to remain;

applying a photo-durable top coat; and curing the top coat.

2. A process as in claim 1 wherein the top coat is cured by infrared energy, ultra violet energy, electron beam radiation or gamma radiation.

3. A process as in claim 1 wherein the top coat is cured by subjection to ulta violet light for 5 seconds to 15 seconds.

4. A process as in claim 1 wherein the adhesive is polyurethane, polyester, epoxy, polyvinyl acetate or ethylene vinyl acetate.

5. A process as in claim 1 wherein the step of applying adhesive to the substrate further comprises the steps of:

applying a first adhesive;

drying the first adhesive;

applying a second adhesive;

drying the second adhesive; and reactivating the first and second adhesives.

6. A process as in claim 5 wherein the first adhesive is urethane applied at a rate of 1.0 to 2.0 grams per square foot and subsequently dried for 8 to 10 seconds at a temperature of 120° F. to 130° F., and wherein the second adhesive is ethylene vinyl acetate applied at a rate of 2.0 to 3.0 grams per square foot and dried for 8 to 10 seconds at a temperature of 130° to 150° F.

7. A process as in claim 6 wherein the adhesives are reactivated by exposure to intense infrared light to achieve a surface temperature of 160° to 200° F.

8. A process as in claim 1 wherein the isocyanate solution comprises 5% to 15% by weight of isocyanate in toluene.

9. A process as in claim 8 wherein the isocyanate solution further comprises 1% to 10% ultra violet light absorbers.

10. A process as in claim 8 wherein the isocyanate solution is allowed to penetrate the decorative paper for approximately 2 seconds.

11. A process as in claim 8 wherein the isocyanate solution is applied at a thickness of from 0.5 mils wet to 5.0 mils wet.

12. A process as in claim 11 wherein the isocyanate solution is applied at a thickness of approximately 2.0 mils wet.

13. A process as in claim 8 wherein after allowing the isocyanate solution to penetrate the decorative paper, the panel is passed through a high velocity oven at a temperature of 120° F. to 380° F. for a period of 8 seconds to 15 seconds to remove the toluene from the isocyanate solution.

14. A process as in claim 13 wherein the temperature of the high velocity oven is approximately 280° F.

* * * * *